UNITED STATES PATENT OFFICE.

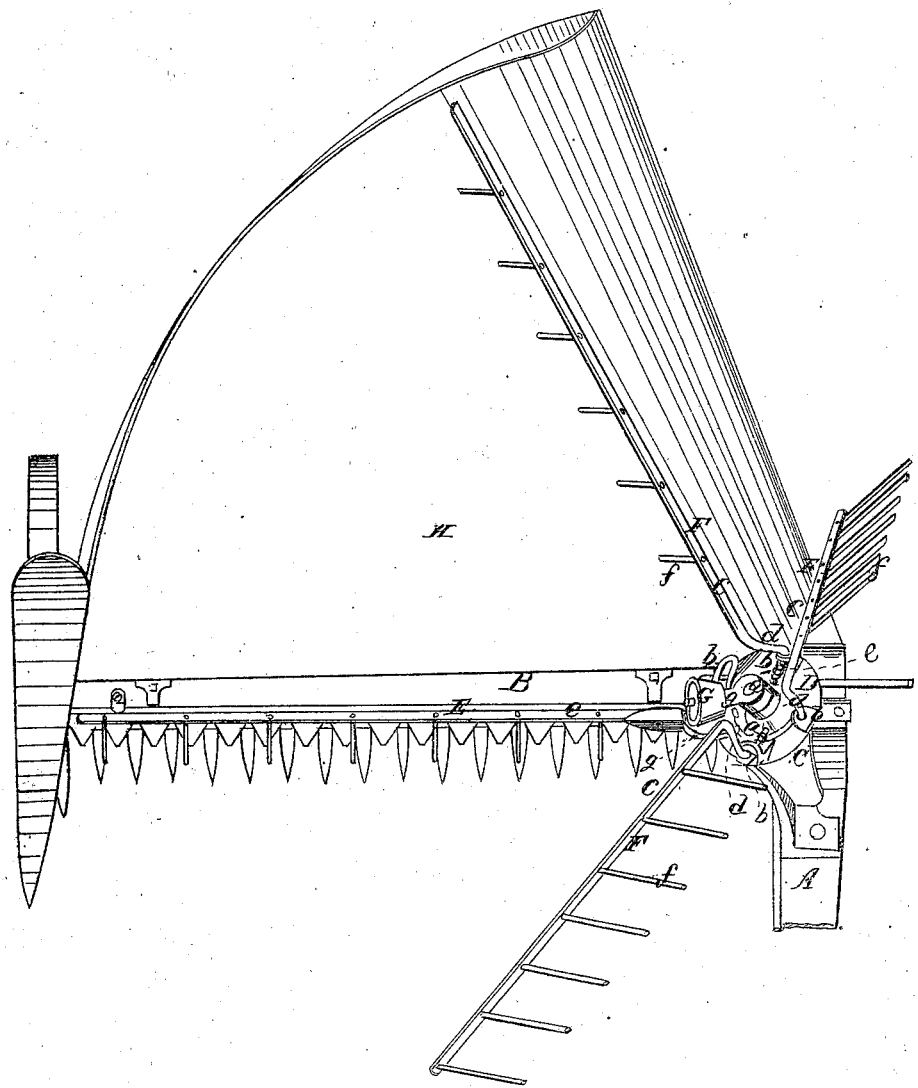

K. H. C. PRESTON, OF MANLIUS, NEW YORK, ASSIGNOR TO HIMSELF, STEPHEN CHENEY, AND M. B. SNOOK.

IMPROVEMENT IN HARVESTER-RAKES.

Specification forming part of Letters Patent No. 81,685, dated September 1, 1868.

*To all whom it may concern:*

Be it known that I, K. H. C. PRESTON, of Manlius, in the county of Onondaga and State of New York, have invented a new and Improved Raking Device for Harvesters; and I do hereby declare that the following is a full, clear, and exact description thereof, which will enable those skilled in the art to make and use the same, reference being had to the accompanying drawings, forming part of this specification.

The accompanying drawing represents a plan or top view of my invention.

On the bar A, to which the finger-bar B of the machine is attached, there is secured a standard, C, having a wheel, D, on its upper end, the axis $a$ of which is inclined from a vertical line, so that the wheel will rotate in a plane having an angle of about forty-five degrees. The upper surface of this wheel has four lugs or projections, $b$, at equal distances apart, through which the inner ends of the heads $c$ of rakes E F F F pass, and are allowed to turn freely therein. The inner ends of the heads $c$ are of crank form, as shown at $d$, and each crank has a spiral spring, $e$, upon it, said springs having a tendency to keep the cranks uppermost or thrown upward, so that the teeth $f$ of the rakes will be uppermost, or not have a downward or pendent position. On the upper part of the standard C there is secured an arm, $g$, on the outer end of which there is placed a conical friction-roller, G. This roller G has such a position that the cranks $d$ of the rakes and beaters E F F F, as they come in contact with it during the rotation of wheel D, will be turned down, and the rake-teeth $f$ made to descend directly in front of the sickle, so that the grain will be properly presented to the same, the teeth $f$ being turned upward under the action of the springs $e$ as the cranks $d$ pass the friction-roller.

The operation above described refers to the rakes F F F, which perform the function of beaters only, the teeth $f$ being employed to add to their efficiency, especially when low or not very high grain is being cut, and rising out of the way as they pass back from the front end of the platform.

The rake E performs the function of a rake, its teeth $f$ remaining down while passing over the entire surface of the platform, and discharging the grain from the rear end thereof. This modification of the movement of the rake E is effected by having an arm, $g'$, attached, which extends back sufficiently far to catch under a projection, $h$, attached to the arm $g'$, the projection $h$ being of such a length as to keep the rake E down while the same is traveling over the entire surface of the platform, the rake-teeth rising after the arm $g'$ has passed the projection.

K represents the platform, which is a section of a hollow cone, the concave surface being uppermost, and corresponding precisely to the sweep the rake E makes in passing over it. By this arrangement it will be seen that a very simple and efficient automatic raking device is obtained, one which will not be liable to get out of repair or become deranged by use.

In backing the machine the rear end of the platform will not come in contact with the earth, in consequence of its curvature upward.

The wheel D may be rotated by any proper driving mechanism from the driving shaft or axle of the device.

I claim as new and desire to secure by Letters Patent—

1. The combination of the crank-arms $d$, of the beaters F, the spiral springs $e$, revolving wheel D, conical roller G, and arm $g'$, all constructed, arranged, and operating as described, for the purpose specified.

2. The arm $g'$, attached to the inner end of the rake E, in combination with the projection $h$, attached to the arm $g$, all arranged substantially as described, for the purpose of keeping said rake down or near the platform while traveling over the same.

K. H. C. PRESTON.

Witnesses:
P. D. HAM,
JOSEPH BAKER.